(12) United States Patent
Kuo et al.

(10) Patent No.: US 7,958,600 B2
(45) Date of Patent: Jun. 14, 2011

(54) PIVOT MECHANISM AND ELECTRONIC DEVICE APPLYING THE SAME

(75) Inventors: Chung-Chi Kuo, Taoyuan County (TW); Chi-Pu Chang, Taoyuan County (TW)

(73) Assignee: First Dome Corp., Taoyuan Hsien (TW)

( * ) Notice: Subject to any disclaimer, the term of this patent is extended or adjusted under 35 U.S.C. 154(b) by 383 days.

(21) Appl. No.: 12/346,851

(22) Filed: Dec. 31, 2008

(65) Prior Publication Data
US 2010/0125976 A1 May 27, 2010

(30) Foreign Application Priority Data
Nov. 24, 2008 (TW) ................................ 97145322 A

(51) Int. Cl.
*E05D 11/08* (2006.01)
(52) U.S. Cl. ........................................................ 16/342
(58) Field of Classification Search .................... 16/342, 16/337, 340, 338, 387–389; 361/679.11, 361/679.12, 679.15, 679.27; 348/373, 333.06, 348/794; 455/550.1, 575.1, 575.3, 575.4; 379/433.12, 433.13
See application file for complete search history.

(56) References Cited

U.S. PATENT DOCUMENTS

| | | | | |
|---|---|---|---|---|
| 6,256,838 B1 * | 7/2001 | Lu | ................................... | 16/342 |
| 6,301,748 B1 * | 10/2001 | Su-Man | .......................... | 16/342 |
| 6,530,123 B1 * | 3/2003 | Wahlstedt | ....................... | 16/342 |
| 6,928,700 B2 * | 8/2005 | Huong | .............................. | 16/342 |
| 7,607,202 B1 * | 10/2009 | Lee | .............................. | 16/342 |
| 2002/0144378 A1 * | 10/2002 | Liao | ................................ | 16/342 |
| 2007/0234517 A1 * | 10/2007 | Larson et al. | ................... | 16/342 |
| 2008/0263826 A1 * | 10/2008 | Huang | ............................. | 16/342 |

* cited by examiner

*Primary Examiner* — Chuck Y. Mah
(74) *Attorney, Agent, or Firm* — Jianq Chyun IP Office

(57) ABSTRACT

A pivot mechanism and an electronic device applying the same are provided. The pivot mechanism includes a pedestal having a bore passing through the pedestal; a shaft inserted into the bore and having at least two leaning surfaces in parallel to an extending direction of the shaft; two bushes coupled to the shaft and fixed in the bore; and a reed set disposed in the bore and arranged between the two bushes. The reed set includes at least one reed, wherein each reed is wedged in the bore and has a hole through which the shaft penetrates. At least one position limiting portion is formed in the periphery of the hole for orienting the shaft. The position limitation portion further extends inwardly to form a slot, by which a cantilever is formed between the slot and the axis hole to lean against the shaft.

28 Claims, 9 Drawing Sheets

PIVOT MECHANISM AND ELECTRONIC DEVICE APPLYING THE SAME

CROSS-REFERENCE TO RELATED APPLICATION

This application claims the priority benefit of Taiwan application serial no. 97145322, filed on Nov. 24, 2008. The entirety of the above-mentioned patent application is hereby incorporated by reference herein and made a part of this specification.

BACKGROUND OF THE INVENTION

1. Field of the Invention

The present invention generally relates to a pivot mechanism and an electronic device applying the pivot mechanism. More particularly, the present invention relates to the pivot mechanism and the electronic device capable of performing reliable rotation and providing locating effect in various orientations.

2. Description of Related Art

In our daily life, various devices including doors, windows, reflecting mirrors of vehicles, or electronic devices such as notebooks, electronic dictionaries, personal digital assistants (PDA), or mobile phones apply pivot mechanisms to perform a rotation or switch on/off. The conventional pivot mechanism has a shaft and a reed set, and utilizes the friction between a stator and a rotor to counteract the torque generated by the gravity of a body driven by the pivot mechanism to locate the body in specific orientation. Therefore, design of the pivot mechanism affects the convenience for a user to operate the aforementioned devices and the reliability of the aforementioned devices.

For example, an exceeding friction between the stator and the rotor leads to a laborious pivot operation, which causes wear of the pivot mechanism and reduces the life time of the pivot mechanism. On the other hand, an insufficient friction leads to a loose fit between the stator and the rotor, which fails to provide an effective locating and may damage the devices when applying an improper loading.

Furthermore, an improper fit of elements of the pivot mechanism may generate a reacting force between the rotor and the stator in the pivoting process, and when the user removes the loading applied on the pivot mechanism, the body connected to the pivot mechanism cannot reach a predetermined position precisely due to the effect of the reacting force.

SUMMARY OF THE INVENTION

Accordingly, the present invention is directed to a pivot mechanism capable of performing reliable rotation and providing locating effect in various orientations.

The present invention is also directed to an electronic device applying the pivot mechanism.

As embodied and broadly described herein, the present invention provides a pivot mechanism comprising: a pedestal, provided with a bore passing through the pedestal; a shaft inserted in the bore, wherein the shaft is a polygonal shaft having at least two leaning surfaces parallel to an extension direction of the shaft; two bushes surrounding the shaft and respectively disposed at two opening ends of the bore, wherein each bush is provided with an external diameter to be wedged in the bore and an internal diameter to lean and locate the shaft; and a reed set disposed in the bore and placed between the two bush. The reed set includes at least one annular reed. Each annular reed has a hole. The shaft passes through the hole of each annular reed. Each annular reed has at least one position limiting portion formed in the periphery of the hole for orienting the shaft. The position limiting portion has at least one slot extending inwardly and a cantilever formed between the slot and the hole for leaning against the shaft. When the shaft is oriented in the bore, the cantilever leans against one of the leaning surfaces of the shaft. Each annular reed further has a locating portion at the outside and the locating portion is wedged in the bore. The hole of each annular reed has an internal diameter smaller than an external diameter of the shaft and the annular reed is elastically deformed by the insertion of the shaft. An external diameter of each annular reed is smaller than an internal diameter of the bore for the elastic deformation of the annular reed.

According to an embodiment of the present invention, each annular reed further has at least one first recess at the outside matched with the bore for locating the annular reed.

In addition, the at least one position limiting portion may comprise a first position limiting portion and a second position limiting portion respectively located at two opposite sides between the first recess and the locating portion. The first position limiting portion is provided with a first slot extending to the first recess to form a first cantilever. The second position limiting portion is provided with a second slot extending to the first recess to form a second cantilever.

According to the aforementioned description, the first cantilever and the second cantilever may respectively lean against two adjacent leaning surface of the shaft to locate the shaft in different orientations in the bore.

According to an embodiment of the present invention, the at least one position limiting portion comprises: a first position limiting portion opposite to the locating portion and having two first slots extending inwardly to form two first cantilevers; a second position limiting portion located at one side between the first position limiting portion and the locating portion, wherein one of the at least one first recess is formed between the first position limiting portion and the second position limiting portion, and the second position limiting portion has two opposite second slots extending inwardly to form two second cantilevers; and a third position limiting portion opposite to the second position limiting portion and located at the other side between the first position limiting portion and the locating portion, wherein another one of the at least one first recess is formed between the first position limiting portion and the third position limiting portion, and the third position limiting portion has two opposite third slots extending inwardly to form two third cantilevers.

According to the aforementioned embodiment, the first cantilevers, the second cantilevers or the third cantilevers respectively may lean against any two adjacent leaning surfaces of the shaft to locate the shaft in different orientations in the bore.

According to the aforementioned embodiment, each annular reed may further have a plurality of second recesses at the outside, and the second recesses are respectively corresponding to the first position limiting portion, the second position limiting portion and the third position limiting portion.

According to the aforementioned embodiment, a width of an annular body of each annular reed may be gradually decreased from the locating portion to the first position limiting portion.

According to an embodiment of the present invention, the pedestal has a locating slot and the locating portion of each annular reed is wedged in the locating slot.

According to an embodiment of the present invention, the aforementioned locating portion of each annular reed connects to the other part of the annular reed via a necking portion there between, and the locating slot clamps the necking portion being as a pivot of elastic deformation of the other part of the annular reed.

According to an embodiment of the present invention, the locating portion of each annular reed has a third recess at the outside to form a clearance between the locating portion and the locating slot.

According to an embodiment of the present invention, each annular reed further has at least one first protruding portion being adjacent to the position limiting portion and leaning against the shaft together with the cantilever.

According to an embodiment of the present invention, the aforementioned each annular reed further has at least one fourth recess at the outside corresponding to the first protruding portion to form a clearance between the annular reed and the pedestal for the elastic deformation of the annular reed in the bore.

According to an embodiment of the present invention, an end of the cantilever of each annular reed has a second protruding portion protruding into the hole of the annular reed before the shaft being inserted in the hole of the annular reed, and the second protruding portion leans against the shaft after the shaft is inserted in the hole of the annular reed.

An electronic device applying the aforementioned pivot mechanism is also provided. The electronic device includes a first body, a second body and at least one aforementioned pivot mechanism. The first body is rotatably connected to the second body via the at least one pivot mechanism, wherein the pedestal of the pivot mechanism is connected to the first body and an end of the shaft is connected to the second body, so that the first body and the second body can be located in specific orientation by the pivot mechanism.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
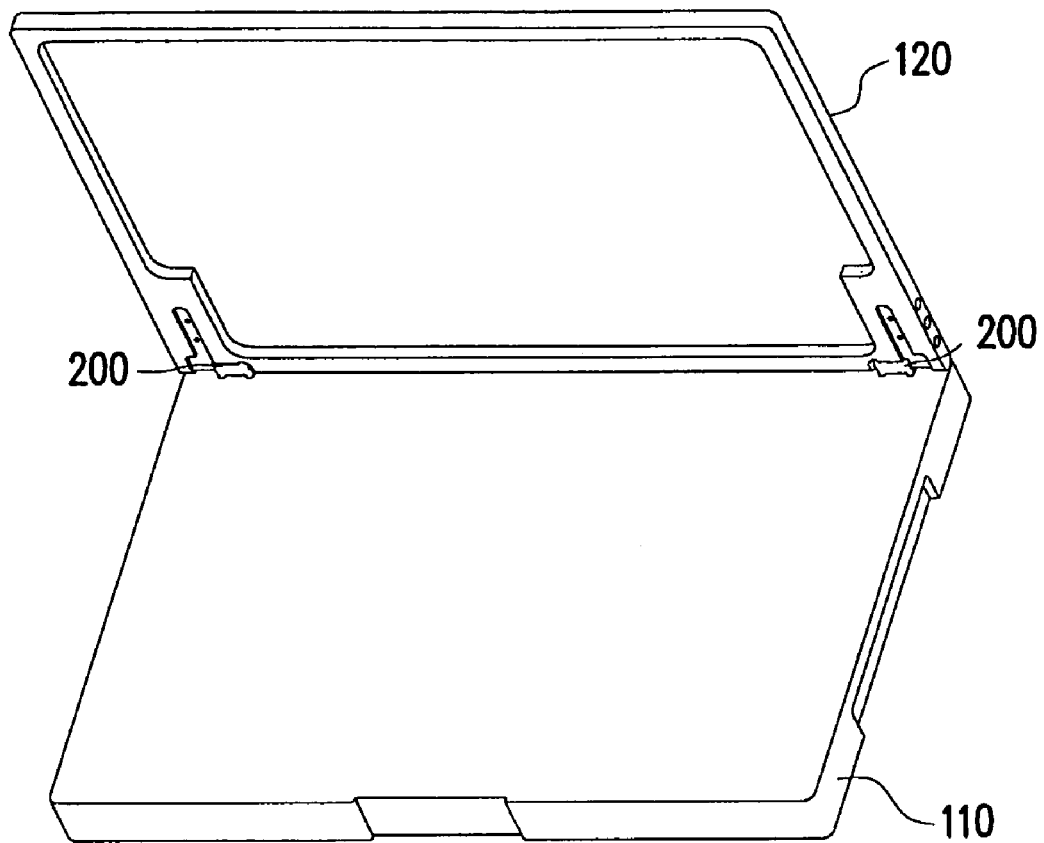
FIG. 1 schematically illustrates a notebook according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The pivot mechanism of the invention can be applied to various devices to perform a reliable and convenient rotation and provides locating effect in different orientations. For example, doors, windows, reflecting mirrors of vehicles, or electronic devices such as notebooks, electronic dictionaries, personal digital assistants (PDA), or mobile phones often seen in our daily life are suitable for the pivot mechanism.

A notebook of the electronic devices is taken as an example for illustrating the details and advantages of the pivot mechanism of the invention. However, people skilled in the art may refer to the following embodiments and transfer the pivot mechanism of the invention to any applicable field or other devices.

Figure 2:
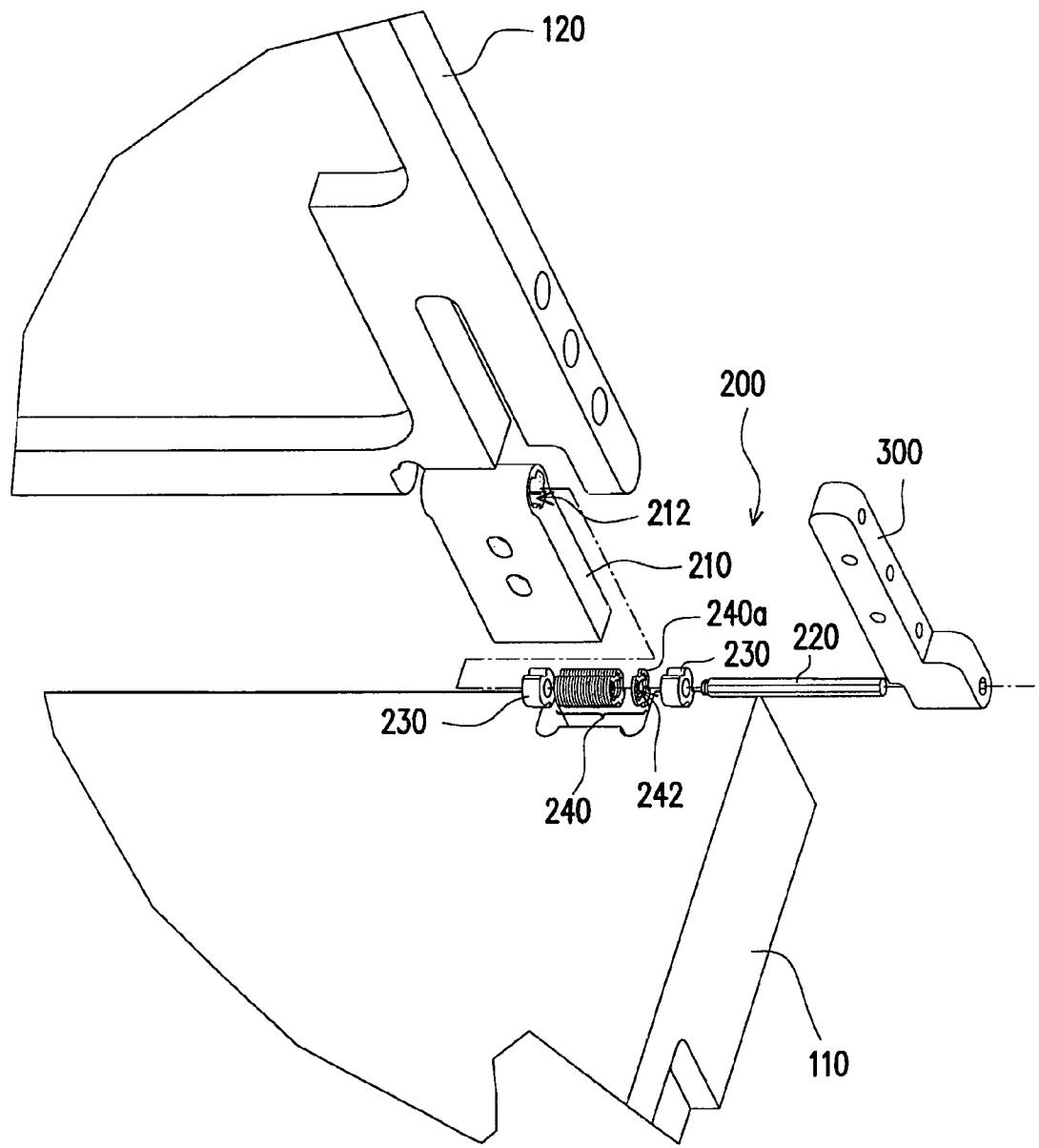
FIG. 2 is a partial explosion diagram illustrating the notebook according to an embodiment of the present invention.

FIG. 1 schematically illustrates a notebook according to an embodiment of the present invention. FIG. 2 is a partial explosion diagram illustrating the notebook according to FIG. 1. Referring to FIG. 1 and FIG. 2, the notebook 100 comprises a first body 110, a second body 120 and pivot mechanisms 200 connected between the first body 110 and the second body 120. The first body 110 may have keyboard, touch pad and internal calculating devices of computer, etc. The second body 120 may have display screen.

In the embodiment, two pivot mechanisms 200 are disposed between the first body 110 and the second body 120. Each pivot mechanism 200 is respectively connected to the first body 110 and the second body 120 through a pedestal 210 and a connecting rod 300. In addition, the pivot mechanism 200 further has a shaft 220, two bushes 230 and a reed set 240. The pedestal 210 has a bore 212 penetrating the pedestal 210, and the shaft 220 is inserted and pivoted in the bore 212 for driving the first body 110 rotating with respect to the second body 120 via the pedestal 210 and the connecting rod 300.

For locating the shaft 220 in the bore 212 of the pedestal 210, the two bushes 230 are disposed on the shaft 220 and located at two opening ends of the bore 212. The bushes 230 are wedged in the bore 212 and the internal diameter of the bushes 230 is sufficient for the shaft 220 to be leaned and located therein. In other words, the shaft 220 pivots in the bore 212 and leans against the bushes 230.

Figure 3:
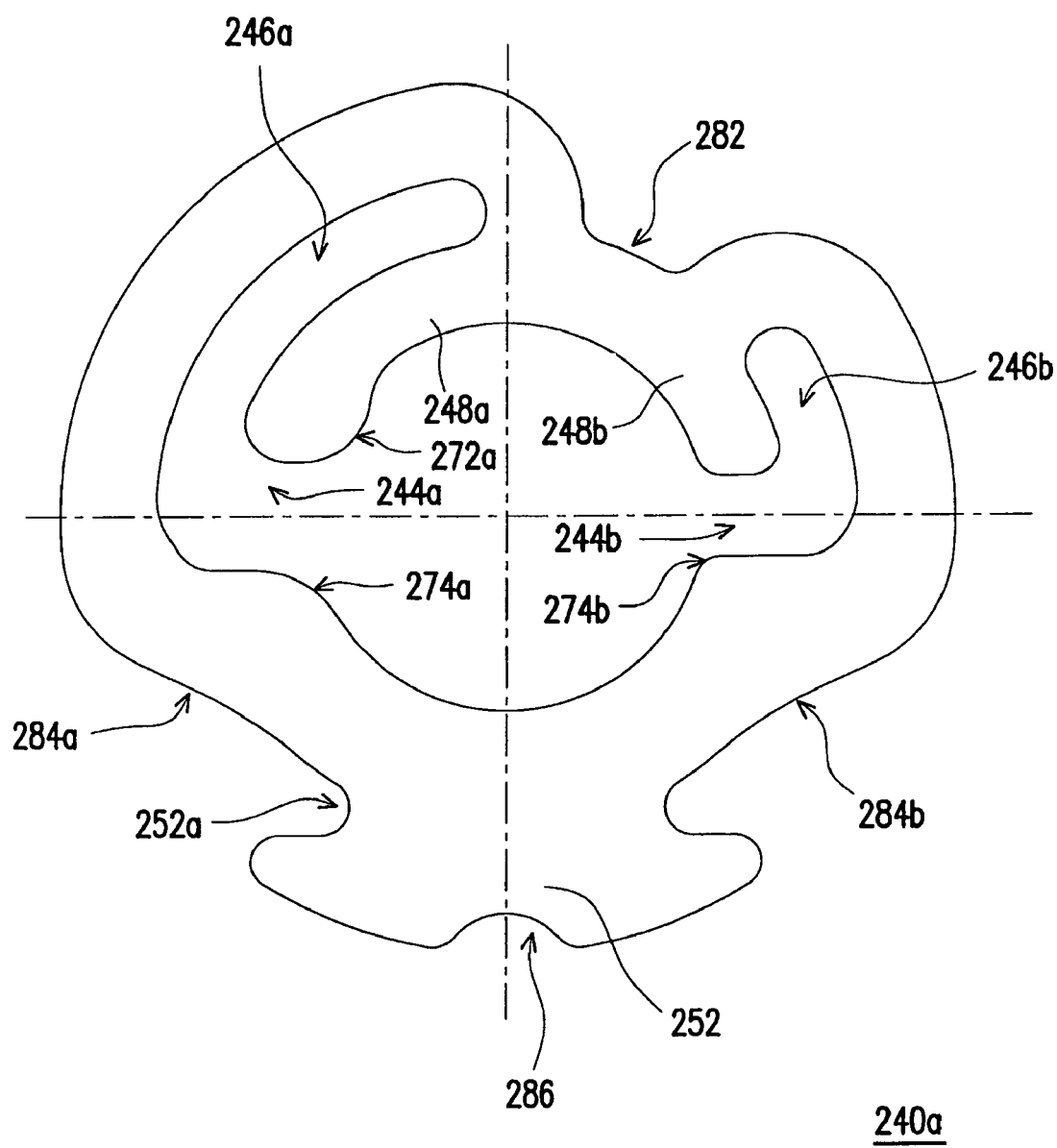
FIG. 3 is a front view of a single annular reed according to an embodiment of the present invention.
Figure 4:
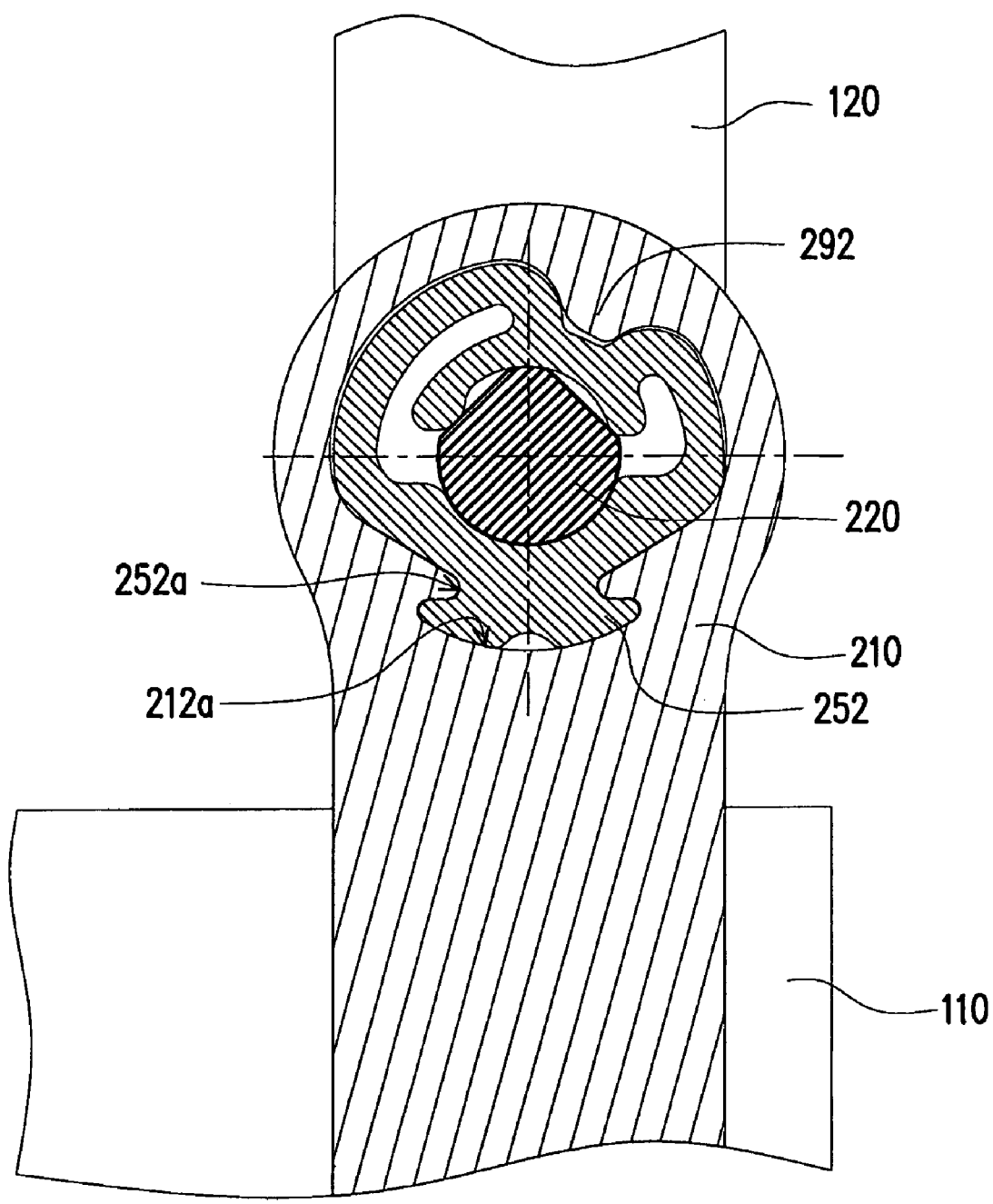
FIG. 4 is a sectional view of the pivot mechanism along an extension direction perpendicular to the shaft according to an embodiment of the present invention.

Furthermore, the reed set 240 is disposed in the bore 212 and arranged between the two bushes 230 to provide locating and damping effect to the shaft 220. The reed set 240 is composed of at least one annular reed 240a, wherein the embodiment illustrates plural annular reeds 240a. FIG. 3 is a front view of a single annular reed 240a. FIG. 4 is a sectional view of the pivot mechanism 200 along an extension direction perpendicular to the shaft 220. As shown in FIG. 3 and FIG. 4, each annular reed 240a has a hole 242 through which the shaft 220 penetrates. Each annular reed 240a has two position limiting portion 244a and 244b formed in the periphery of the hole 242 for orienting the shaft 220. The position limiting portion 244a and the position limiting portion 244b respectively have a slot 246a and a slot 246b both extending inwardly to form cantilevers 248a and 248b between the slots 246a and 246b and the hole 242. The cantilevers 248a and 248b lean against the shaft 220. In this embodiment, an end of the cantilever 248a has a protruding portion 272a for enhancing the effect of the cantilever 248a leaning against the shaft 220. The protruding portion 272a protrudes into the hole 242 of the annular reed 240a before the shaft 220 being inserted in the hole 242 of the annular reed 240a, and the protruding portion 272a leans against the shaft 220 after the shaft 220 is inserted in the hole 242 of the annular reed 240.

Additionally, the annular reed 240a has a recess 282 at the outside, wherein the recess 282 located correspondingly between the position limiting portion 244a and the position limiting portion 244b. The pedestal 210 has a protruding portion 292 locating in the bore 212 and fitting with the recess 282 to locate the annular reed 240a in the bore 212. Since the recess 282 is located between the position limiting portion 244a and the position limiting portion 244b, when the cantilevers 248a and 248b lean against the shaft 220 and perform an elastic deformation, the recess 282 and the protruding portion 292 are interferes with each other to provide an appropriate location limiting effect to the annular reed 240a and prevent the annular reed 240a from excessive deviation.

In this embodiment, the annular reed 240a has protruding portions 274a and 274b respectively adjacent to the position limiting portions 244a and 244b and leaning against the shaft 220 together with the cantilevers 248a and 248b. On the other hand, considering the loading condition of the protruding portions 274a and 274b leaning against the shaft 220, recesses 284a and 284b are further formed at the out side of the annular reed 240a correspond to the protruding portions 274a and 274b to form clearances between the annular reed 240a and the pedestal 210 for being as a buffering space of the elastic deformation of the annular reed 240a in the bore 212.

It should be noted that the quantity and the position of the position limiting portions and the corresponding slots, protruding portions and cantilevers are not limited therein. According to practical design requirements, the arrangements of the position limiting portions and the corresponding slots, protruding portions and cantilevers can be modified.

Furthermore, referring to FIGS. 2-4, the shaft 220 of the embodiment is a polygonal shaft 220 to provide effect of damping and locating in different orientations. In this embodiment, the shaft 220 has two leaning surfaces 222a and 222b in parallel to an extension direction thereof. In addition, each annular reed 240a has a locating portion 252 at the out side and the locating portion 252 is wedged in the bore 212 for locating the annular reed 240a in the bore 212.

In this embodiment, the pedestal 210 has a locating slot 212a and the locating portion 252 of the annular reed 240a is wedged in the locating slot 212a. Specifically, the locating portion 252 of the annular reed 240a connects to the other part of the annular reed 240a via a necking portion 252a there between, and the locating slot 212a clamps the necking portion 252a being as a pivot of elastic deformation of the other part of the annular reed 240a. In addition, the locating portion 252 of the annular reed 240a has a recess 286 at the outside to form a clearance between the locating portion 252 and the locating slot 212a for being as a buffering space of the elastic deformation of the annular reed 240a.

In this embodiment, the hole 242 of the annular reed 240a can be slightly smaller than the external diameter of the shaft 220, such that the annular reed 240a elastically deforms and leans against the shaft 220 when the shaft 220 is inserted into the hole 242. Further, the external diameter of the annular reed 240a can be slightly smaller than the bore 212 of the pedestal 210, wherein clearances is formed between the annular reed 240a and the bore 212 for the elastic deformation of annular reed 240a in the bore 212. Therefore, the shaft 220 can pivot in the hole 240a of the annular reed 240a and interfere with the position limiting portions 244a and 244b, the cantilevers 248a and 248b and the protruding portions 274a and 274b in the hole 242 to achieve the effect of damping and locating in various orientations between the shaft 220 and the annular reed 240a. Specifically, when the shaft 220 is located in the bore 212 of the pedestal 210, at least one of the cantilevers 248a and 248b leans against the leaning surfaces 222a and 222b of the shaft 220 together with the corresponding protruding portion 274a or 274b.

Figure 5:
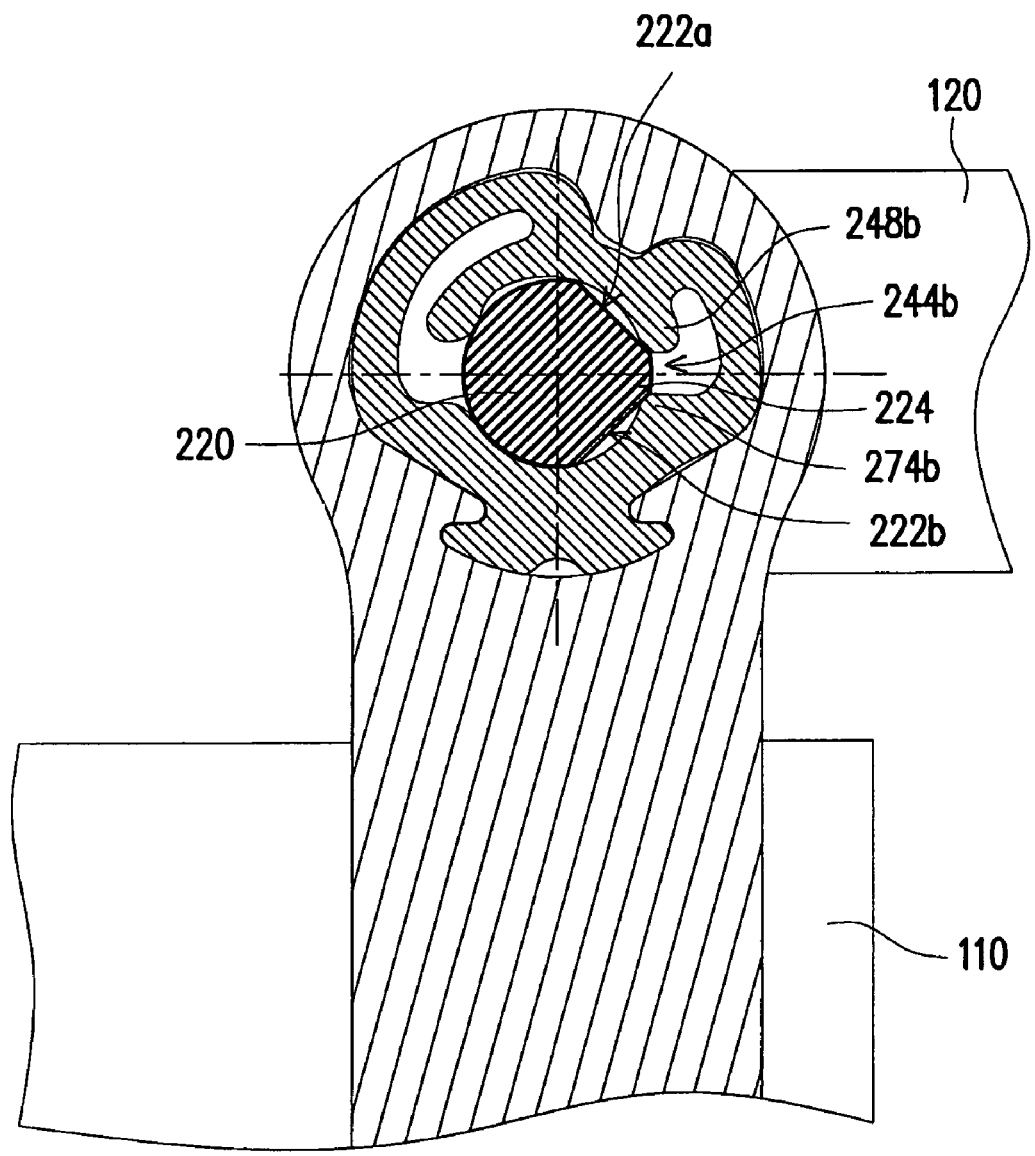
FIGS. 5-7 respectively illustrate a partial structure of the aforementioned notebook applying the pivot mechanism in different orientations.
Figure 6:
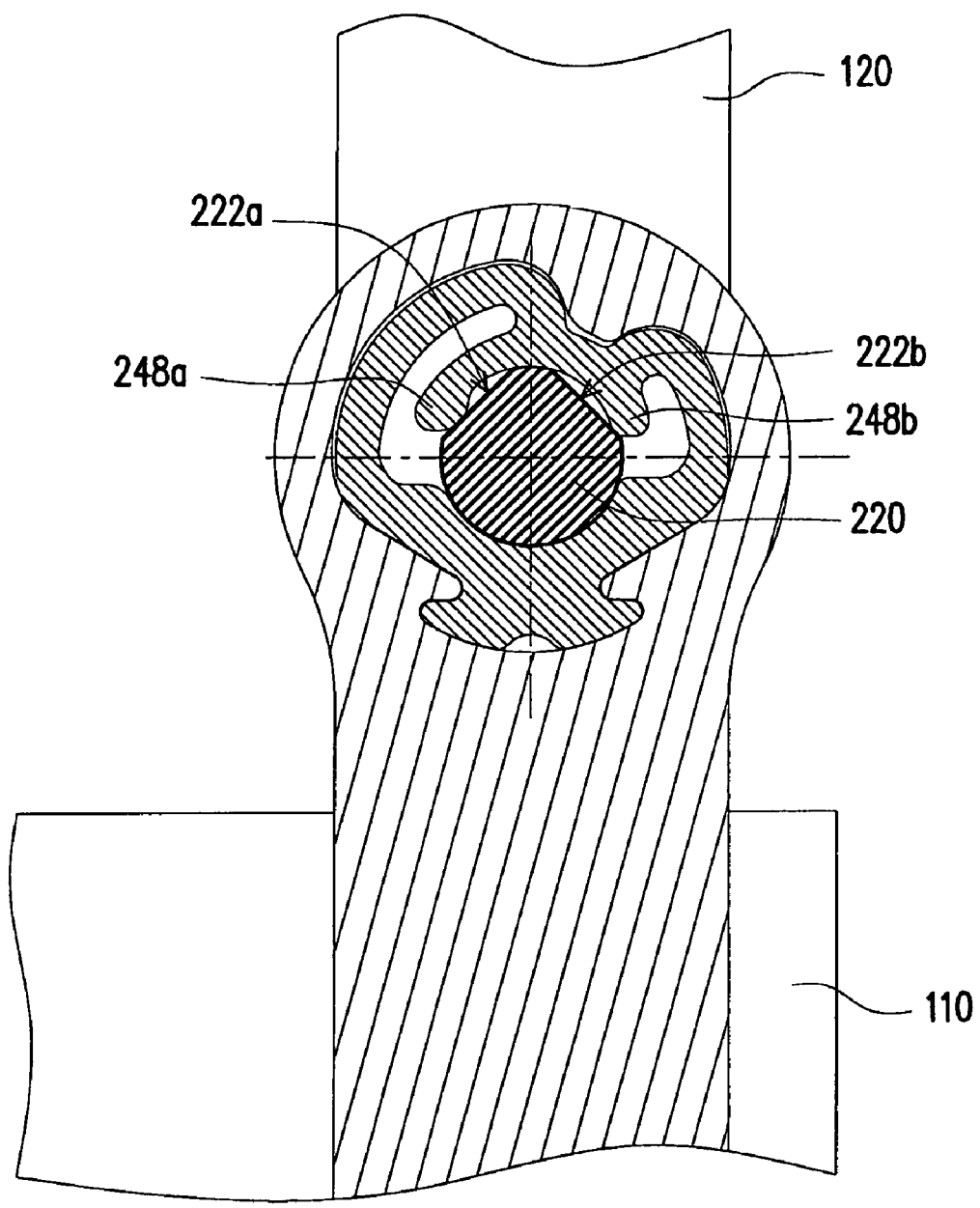
Figure 7:
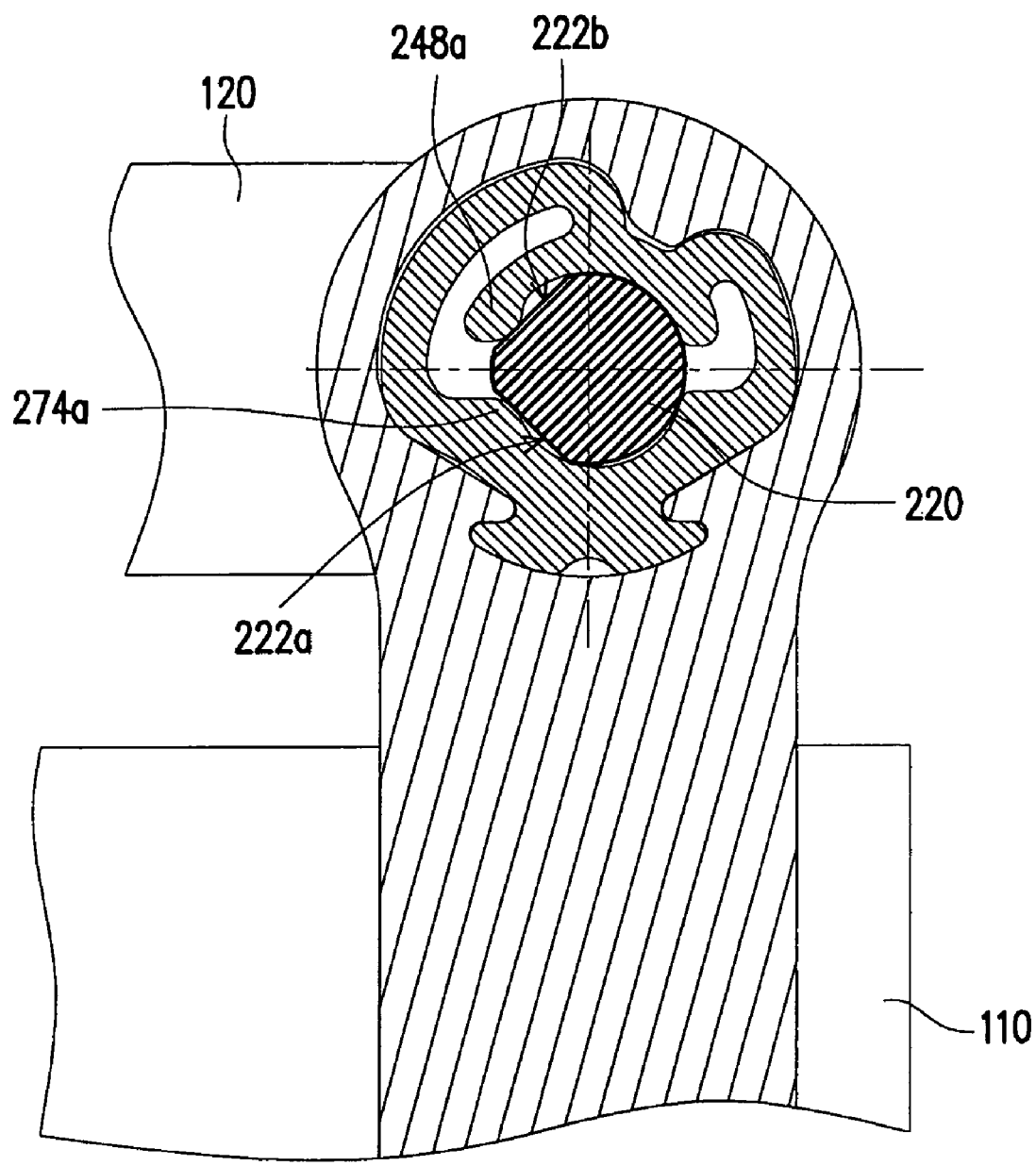

For a further illustration of the operational manner of the pivot mechanism of the present invention, FIGS. 5-7 respectively illustrate a partial structure of the aforementioned notebook 100 applying the pivot mechanism 200 in different orientations. FIG. 5 illustrates the first body 110 and the second body 120 spread with an included angle of 180°. FIG. 6 illustrates the first body 110 and the second body 120 spread with an included angle of 90°. FIG. 7 illustrates the first body 110 and the second body 120 stacked with an included angle of 0°.

In more detail, when the notebook 100 is in the spread state with the included angle of 180° as shown in FIG. 5, the leaning surfaces 222a and 222b of the shaft 220 interferes with the position limiting portion 244b of the annular reed 240a. The cantilever 248b and the protruding portion 274b located at two opposite sides of the position limiting portion 244b respectively lean against the leaning surfaces 222a and 222b of the shaft 220 for locating the shaft 220 and the second body 120 connecting thereto.

In addition, when the notebook 100 is in the spread state with the included angle of 90° as shown in FIG. 6, the protruding portion 224 between the leaning surfaces 222a and 222b of the shaft 220 locates between the cantilever 248a and 248b, and the cantilevers 248a and 248b respectively lean against the leaning surfaces 222a and 222b of the shaft 220 for locating the shaft 220 and the second body 120 connecting thereto.

Furthermore, when the notebook 100 is in the stacked state with the included angle of 0° as shown in FIG. 7, the protruding portion 224 between the leaning surfaces 222a and 222b of the shaft 220 interferes with the position limiting portion 244a of the annular reed 240a. The cantilever 248a and the protruding portion 274a located at two opposite sides of the position limiting portion 244a respectively lean against the leaning surfaces 222a and 222b of the shaft 220 for locating the shaft 220 and the second body 120 connecting thereto.

It should be noted that since the leaning surfaces 222a and 222b of the shaft 220 lean against the cantilevers 248a, 248b or the protruding portions 274a and 274b, by which a damping effect is generated when the shaft 220 pivots and approaches to a specific orientation such as the aforementioned state with the included angle of 0°, 90° or 180°, and the resilient force of the annular reed 240a and the cantilevers 248a and 248b thereof will push the shaft 220 to the exact orientation. Especially, in some specific orientation, such as the stacked state with the included angle of 0°, the reaction force generated by the friction between the pedestal 210 and the shaft 220 can be counteracted by the aforementioned resilient force. And even the user stop applying the force to close the notebook, the shaft 220 and the second body 120 connected thereto can still reaches to the exact orientation automatically due to the resilient force.

In other words, by the combination of the polygonal shaft 220 and the annular reed 240a, the embodiment can achieve the effect called "easy open, easy close". That is, when the shaft 220 pivots to approach a specific orientation, for example the included angle between the first body 110 and the second body 120 approaches 0°, 90° or 180°, the contact area between the annular reed 240a and the shaft 220 becomes smaller, and the friction and the damping effect is getting reduced. The user can apply merely a little force or even no force to make the first body 110 and the second body 120 being easily or automatically oriented in the included angle of 0°, 90° or 180°. In this time, the annular reed 240a and the shaft 220 are in a relatively stable state and the friction and damping effect applied to the shaft 220 is reduced to a relatively minimum value.

Taking the operational manner of the notebook 100 of FIG. 1 as an example, in the process of closing the notebook 100 and when the included angle between the second body 120 and the first body 110 becomes 0°, the friction and damping effect applied to the shaft 220 is reduced to a relatively minimum value, and thus the user can apply merely a little force or even no force to close the second body 120 and the first body 110. Similarly, when the user want to open the notebook 100, only a force equal to or slightly larger than the gravity of the second body 120 is required to separate the second body 120 and the first body 110. Of course, similar effects can also be obtained when the included angle between the first body 110 and the second body 120 is another specific angle, such 0° or 90°. And in other included angles except the aforementioned angles, the shaft 200 suffers a regular friction and damping effect to provide reliable locating effect between the second body 120 and the first body 110.

Figure 8:
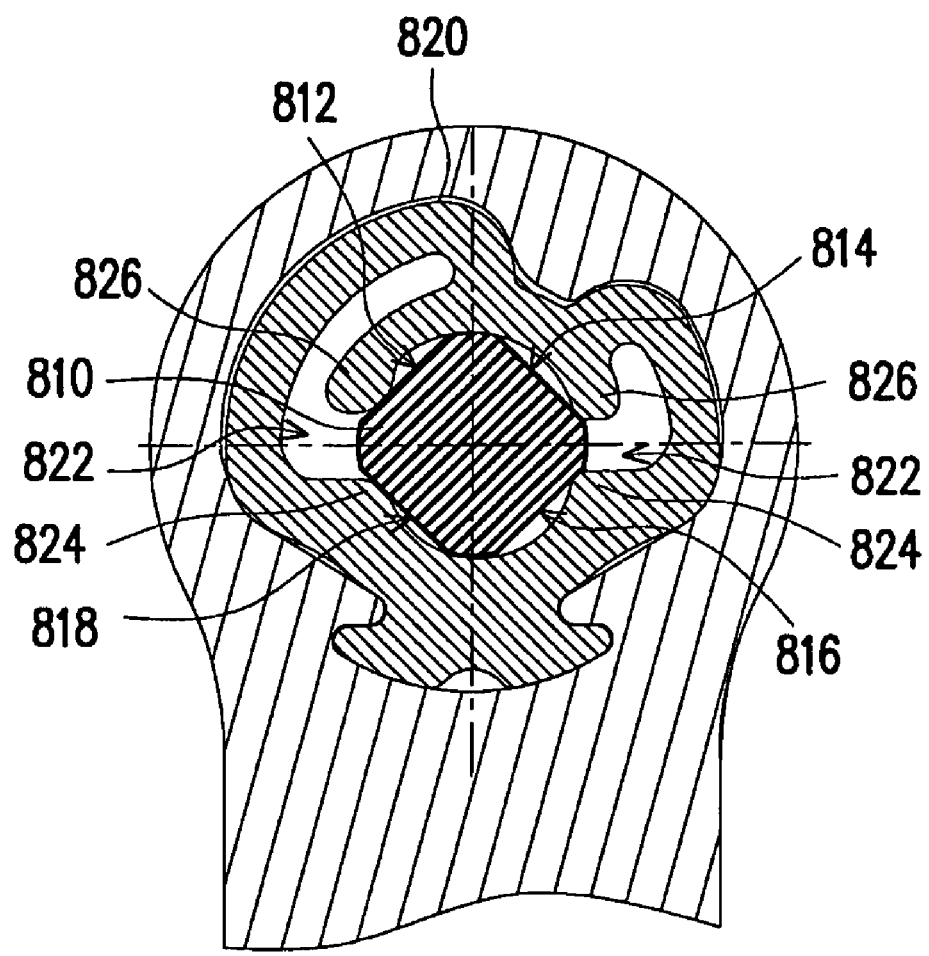
FIG. 8 is a sectional view of a pivot mechanism along an extension direction perpendicular to a shaft according to another embodiment of the present invention.

Although the above embodiment illustrates the shaft 220 with only two leaning surfaces 222a and 222b, the invention provides no limitations on the quantity of the leaning surface of the shaft. FIG. 8 is a sectional view of a pivot mechanism along an extension direction perpendicular to a shaft according to another embodiment of the present invention. As shown in FIG. 8, the shaft 810 has four leaning surfaces 812 814, 816 and 818 for interfering with the position limiting portions 822, the protruding portions 824 and the cantilevers 826 of the annular reed 820 when the shaft 810 and the annular reed 820 are located in different orientations. In other words, by modifying the arrangement of the position limiting portions, the protruding portions and the cantilevers of the annular reed and adjusting the quantity, profile or location of the leaning surface of the shaft, the shaft can be located in various orientations in respect to the annular reed.

Further another annular reed is illustrated in the following paragraph.

Figure 9:
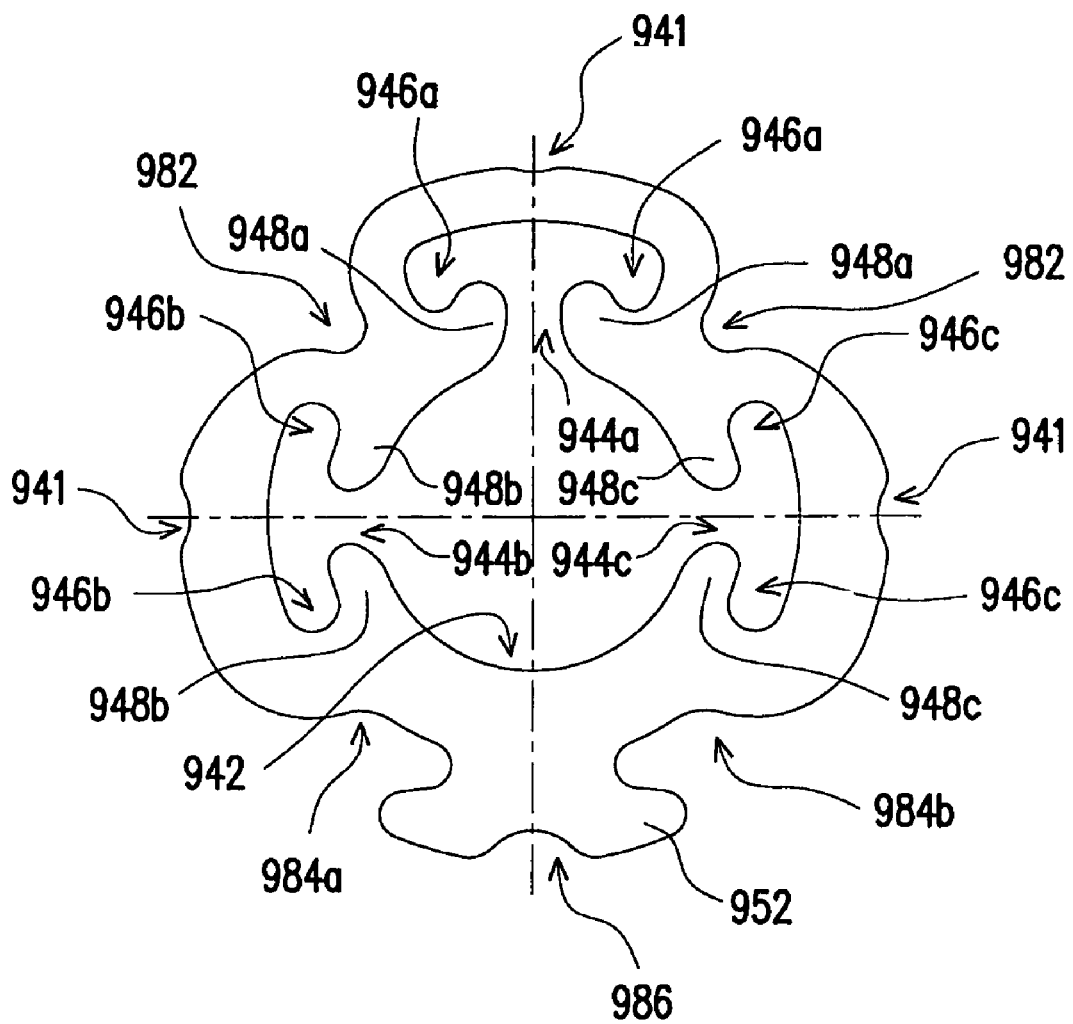
FIG. 9 is a front view of another type of annular reed according to another embodiment of the present invention.

FIG. 9 is a front view of another type of annular reed according to another embodiment of the present invention. The annular reed of the embodiment has three position limiting portions, and each position limiting portion has two cantilevers for leaning against the leaning surfaces of the shaft to achieve locating effect of various orientations. Referring to FIG. 9, each annular reed 940a has a hole 942, through which a shaft penetrates. The annular reed 940a has three position limiting portions 944a, 944b and 944c in the periphery of the hole 942 for locating the shaft. The position limiting portion 944a is opposite to the locating portion 952, and the position limiting portion 944b and the position limiting portion 944c are respectively located at two opposite sides between the position limiting portion 944a and the locating portion 952.

In this embodiment, the position limiting portion 944a has two slots 946a extending inwardly to form two cantilevers 948a between the slots 946a and the hole 942 for leaning against the shaft. In addition, the position limiting portion 944b has two slots 946b extending inwardly to form two cantilevers 948b between the slots 946b and the hole 942 for leaning against the shaft. Furthermore, the position limiting portion 944c has two slots 946c extending inwardly to form two cantilevers 948c between the slots 946c and the hole 942 for leaning against the shaft.

The annular reed 940a has a plurality of recesses 982 at the outside, wherein the recesses 982 are correspondingly located between the position limiting portions 944a and 944b and between the position limiting portions 944a and 944c, and the recesses 982 fit to the protruding portions formed in the bore of the pedestal to locate the annular reed 940a. When the shaft pivots and the cantilevers 948a, 948b and 948c leans against the shaft to generate an elastic deformation, the recesses 982 respectively interfere with the protruding portions in the bore to provide an position limiting effect and prevent the annular reed 940a from excessive deviation.

In this embodiment, the annular reed 940a further has recesses 984a and 984b adjacent to the locating portion 952 and being respectively located at two opposite sides of the locating portion 952. The locating portion 952 has a recess 986. In addition, the annular reed 940a further has a plurality of recesses 941 corresponding to the position limiting portions 944a, 944b and 944c. Clearances are formed between the annular reed 940a and the pedestal by the recesses 941, 984a and 984b to provide a buffering space for the elastic deformation of the annular reed 940a in the bore.

Furthermore, a width of an annular body of the annular reed 940a can be gradually decreased from the locating portion 952 to the position limiting portion 944a. In other words, the elasticity of the annular body of the annular reed 940a is gradually increased from the locating portion 952 to the position limiting portion 944a. Therefore, when the shaft pivots in the annular reed 940a, the deformation of the position limiting portion 944a and its neighboring region of the annular reed 940a is larger than that of the other part of the annular reed 940a, especially the locating portion 952 and its neighboring region, so as to improve a pivot locating effect.

Accordingly, the pivot mechanism of the present invention adopts a reed seta composed of a single type of annular reed to provide locating and damping effect to the shaft. The pivot mechanism can achieve precisely and exactly orientation and further has simple mechanism for mass production, and thereby the manufacturing cost is reduced and the production yield is improved. In addition, the device applying the pivot mechanism can perform a reliable and convenient rotation and: provide locating effect in different orientations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pivot mechanism, comprising:
    a pedestal, provided with a bore passing through the pedestal;
    a shaft, inserted in the bore, wherein the shaft is a polygonal shaft having at least two leaning surfaces parallel to an extension direction of the shaft;
    two bushes, surrounding the shaft and respectively disposed at two opening ends of the bore, wherein each bush is provided with an external diameter to be wedged in the bore and an internal diameter to lean and locate the shaft; and
    a reed set, disposed in the bore and placed between the two bush, wherein the reed set includes at least one annular reed, each annular reed has a hole, the shaft passes through the hole of each annular reed, each annular reed has at least one position limiting portion formed in the periphery of the hole for orienting the shaft, the position limiting portion has at least one slot extending inwardly away from the hole and a cantilever formed between the slot and the hole for leaning against the shaft, when the shaft is oriented in the bore the cantilever leans against one of the leaning surfaces of the shaft, each annular reed further has a locating portion at the outside periphery and the locating portion is wedged in the bore, the hole of each annular reed has an internal diameter smaller than an external diameter of the shaft, the annular reed is elastically deformed by the insertion of the shaft, and an external diameter of each annular reed is smaller than an internal diameter of the bore for the elastic deformation of the annular reed.

2. The pivot mechanism according to claim 1, wherein each annular reed further has at least one first recess at the outside matched with the bore for locating the annular reed.

3. The pivot mechanism according to claim 2, wherein the at least one position limiting portion comprises a first position limiting portion and a second position limiting portion respectively located at two opposite sides between the first recess and the locating portion, the first position limiting portion is provided with a first slot extending to the first recess to form a first cantilever and the second position limiting portion is provided with a second slot extending to the first recess to form a second cantilever.

4. The pivot mechanism according to claim 3, wherein the first cantilever and the second cantilever respectively lean against two adjacent leaning surface of the shaft to locate the shaft in different orientations in the bore.

5. The pivot mechanism according to claim 2, wherein the at least one position limiting portion comprises:
a first position limiting portion opposite to the locating portion and having two first slots extending inwardly to form two first cantilevers;
a second position limiting portion located at one side between the first position limiting portion and the locating portion, wherein one of the at least one first recess is formed between the first position limiting portion and the second position limiting portion, and the second position limiting portion has two opposite second slots extending inwardly to form two second cantilevers; and
a third position limiting portion opposite to the second position limiting portion and located at the other side between the first position limiting portion and the locating portion, wherein another one of the at least one first recess is formed between the first position limiting portion and the third position limiting portion, and the third position limiting portion has two opposite third slots extending inwardly to form two third cantilevers.

6. The pivot mechanism according to claim 5, wherein the first cantilevers, the second cantilevers or the third cantilevers respectively lean against any two adjacent leaning surfaces of the shaft to locate the shaft in different orientations in the bore.

7. The pivot mechanism according to claim 5, wherein each annular reed further has a plurality of second recesses at the outside, the second recesses respectively corresponding to the first position limiting portion, the second position limiting portion and the third position limiting portion.

8. The pivot mechanism according to claim 5, wherein a width of an annular body of each annular reed is gradually decreased from the locating portion to the first position limiting portion.

9. The pivot mechanism according to claim 1, wherein the pedestal has a locating slot and the locating portion of each annular reed is wedged in the locating slot.

10. The pivot mechanism according to claim 9, wherein the locating portion of each annular reed connects to the other part of the annular reed via a necking portion there between, and the locating slot clamps the necking portion being as a pivot of elastic deformation of the other part of the annular reed.

11. The pivot mechanism according to claim 1, wherein the locating portion of each annular reed has a third recess at the outside to form a clearance between the locating portion and the locating slot.

12. The pivot mechanism according to claim 1, wherein each annular reed further has at least one first protruding portion being adjacent to the position limiting portion and leaning against the shaft together with the cantilever.

13. The pivot mechanism according to claim 12, wherein each annular reed further has at least one fourth recess at the outside corresponding to the first protruding portion to form a clearance between the annular reed and the pedestal for the elastic deformation of the annular reed in the bore.

14. The pivot mechanism according to claim 1, wherein an end of the cantilever of each annular reed has a second protruding portion protruding into the hole of the annular reed before the shaft being inserted in the hole of the annular reed, and the second protruding portion leans against the shaft after the shaft is inserted in the hole of the annular reed.

15. An electronic device, comprises:
a first body;
a second body; and
at least one pivot mechanism, wherein the first body is rotatably connected to the second body via the at least one pivot mechanism, the pivot mechanism comprising:
a pedestal, provided with a bore passing through the pedestal and connected to the first body;
a shaft, inserted in the bore, wherein an end of the shaft is connected to the second body, and the shaft is a polygonal shaft having at least two leaning surfaces parallel to an extension direction of the shaft;
two bush, surrounding the shaft and respectively disposed at two opening ends of the bore, wherein each bush is provided with an external diameter to be wedged in the bore and an internal diameter to lean and locate the shaft; and
a reed set, disposed in the bore and placed between the two bush, wherein the reed set includes at least one annular reed, each annular reed has a hole, the shaft passes through the hole of each annular reed, each annular reed has at least one position limiting portion formed in the periphery of the hole for orienting the shaft, the position limiting portion has at least one slot extending inwardly away from the hole and a cantilever formed between the slot and the hole for leaning against the shaft, when the shaft is oriented in the bore the cantilever leans against one of the leaning surfaces of the shaft, each annular reed further has a locating portion at the outside periphery and the locating portion is wedged in the bore, and an external diameter of each annular reed is smaller than an internal diameter of the bore for an elastic deformation of the annular reed.

16. The electronic device according to claim 15, wherein each annular reed further has at least one first recess at the outside matched with the bore for locating the annular reed.

17. The electronic device according to claim 16, wherein the at least one position limiting portion comprises a first position limiting portion and a second position limiting portion respectively located at two opposite sides between the first recess and the locating portion, the first position limiting portion is provided with a first slot extending to the first recess to form a first cantilever and the second position limiting portion is provided with a second slot extending to the first recess to form a second cantilever.

18. The electronic device according to claim 17, wherein the first cantilever and the second cantilever respectively lean against two adjacent leaning surface of the shaft to locate the shaft in different orientations in the bore.

19. The electronic device according to claim 16, wherein the at least one position limiting portion comprises:

a first position limiting portion opposite to the locating portion and having two first slots extending inwardly to form two first cantilevers;

a second position limiting portion located at one side between the first position limiting portion and the locating portion, wherein one of the at least one first recess is formed between the first position limiting portion and the second position limiting portion, and the second position limiting portion has two opposite second slots extending inwardly to form two second cantilevers; and a third position limiting portion opposite to the second position limiting portion and located at the other side between the first position limiting portion and the locating portion, wherein another one of the at least one first recess is formed between the first position limiting portion and the third position limiting portion, and the third position limiting portion has two opposite third slots extending inwardly to form two third cantilevers.

20. The electronic device according to claim 19, wherein the first cantilevers, the second cantilevers or the third cantilevers are respectively lean against any two adjacent leaning surfaces of the shaft to locate the shaft in different orientations in the bore.

21. The electronic device according to claim 19, wherein each annular reed further has a plurality of second recesses at the outside, the second recesses respectively corresponding to the first position limiting portion, the second position limiting portion and the third position limiting portion.

22. The electronic device according to claim 19, wherein a width of an annular body of each annular reed is gradually decreased from the locating portion to the first position limiting portion.

23. The electronic device according to claim 15, wherein the pedestal has a locating slot and the locating portion of each annular reed is wedged in the locating slot.

24. The electronic device according to claim 23, wherein the locating portion of each annular reed connects to the other part of the annular reed via a necking portion there between, and the locating slot clamps the necking portion being as a pivot of elastic deformation of the other part of the annular reed.

25. The electronic device according to claim 15, wherein the locating portion of each annular reed has a third recess at the outside to form a clearance between the locating portion and the locating slot.

26. The electronic device according to claim 15, wherein each annular reed further has at least one first protruding portion being adjacent to the position limiting portion and leaning against the shaft together with the cantilever.

27. The electronic device according to claim 26, wherein each annular reed further has at least one fourth recess at the outside corresponding to the first protruding portion to form a clearance between the annular reed and the pedestal for the elastic deformation of the annular reed in the bore.

28. The electronic device according to claim 15, wherein an end of the cantilever of each annular reed has a second protruding portion protruding into the hole of the annular reed before the shaft being inserted in the hole of the annular reed, and the second protruding portion leans against the shaft after the shaft is inserted in the hole of the annular reed.

* * * * *